(12) United States Patent
Silva et al.

(10) Patent No.: US 11,741,715 B2
(45) Date of Patent: Aug. 29, 2023

(54) AUTOMATIC CREATION AND ANNOTATION OF SOFTWARE-RELATED INSTRUCTIONAL VIDEOS

(71) Applicant: International Business Machines Corporation, Armonk, NY (US)

(72) Inventors: Bruno Silva, São Paulo (BR); Marco Aurelio Stelmar Netto, Sao Paulo (BR); Renato Luiz de Freitas Cunha, São Paulo (BR); Vagner Figueredo de Santana, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 487 days.

(21) Appl. No.: 16/884,188

(22) Filed: May 27, 2020

(65) Prior Publication Data

US 2021/0375154 A1    Dec. 2, 2021

(51) Int. Cl.
*G06V 20/00* (2022.01)
*G06V 20/40* (2022.01)
*G06N 3/08* (2023.01)
*G09B 5/06* (2006.01)
*G06F 9/451* (2018.01)

(52) U.S. Cl.
CPC .............. *G06V 20/46* (2022.01); *G06N 3/08* (2013.01); *G06V 20/41* (2022.01); *G09B 5/065* (2013.01); *G06F 9/453* (2018.02)

(58) Field of Classification Search
CPC .......... G06V 20/46; G06V 20/41; G06N 3/08; G09B 5/065; G09B 5/06; G09B 7/02; G06F 9/453
See application file for complete search history.

(56) References Cited

U.S. PATENT DOCUMENTS 6,092,074 A   7/2000  Rodkin et al.
6,512,968 B1  1/2003  Bellefeuille et al.
(Continued)

FOREIGN PATENT DOCUMENTS

EP    1536357 A1   6/2005
KR  100982165 B1   9/2010
(Continued)

OTHER PUBLICATIONS

Method and System of Dynamically Updating Software Technical Document Based on Software Updates, Jan. 26, 2010, https://priorart.ip.com/IPCOM/000192616.*

(Continued)

*Primary Examiner* — Girumsew Wendmagegn
(74) *Attorney, Agent, or Firm* — CANTOR COLBURN LLP; Michael A. Petrocelli

(57) ABSTRACT

Aspects of the invention include receiving a first instructional video describing a first method of using a function of a first software application; determining each step of the first method described in the first instructional video; determining, by the processor, a second method of using a first function of a second software application, wherein the first function of the first software application is substantially the same as the first function of the second software application; and creating a second instructional video describing each step of the second method.

20 Claims, 5 Drawing Sheets

(56) References Cited

U.S. PATENT DOCUMENTS

| | | |
|---|---|---|
| 8,209,396 B1 | 6/2012 | Raman et al. |
| 8,296,801 B2 | 10/2012 | Takagi et al. |
| 8,818,175 B2 | 8/2014 | Dubin et al. |
| 9,002,895 B2 | 4/2015 | Doig et al. |
| 9,167,189 B2 | 10/2015 | Shahraray et al. |
| 9,202,141 B2 | 12/2015 | Chaudhuri et al. |
| 9,389,991 B1 | 7/2016 | Molner et al. |
| 9,436,875 B2 | 9/2016 | Curcio et al. |
| 9,554,020 B2 | 1/2017 | Thurston, II et al. |
| 9,564,063 B1 | 2/2017 | Hunt et al. |
| 2009/0047644 A1 | 2/2009 | Mensah et al. |
| 2014/0259000 A1 | 9/2014 | Desanti et al. |
| 2015/0177951 A1 | 6/2015 | Hintermeister et al. |
| 2021/0232873 A1* | 7/2021 | Kothari ................. G06V 10/94 |
| 2021/0326643 A1* | 10/2021 | Fancellu ............. G06K 9/6256 |

FOREIGN PATENT DOCUMENTS

| | | |
|---|---|---|
| WO | 200147256 A1 | 6/2001 |
| WO | 2013106013 A1 | 7/2013 |

OTHER PUBLICATIONS

Webb, A transitory interface component for the in-context visualization and adjustment of a value. Diss. Texas A & M University, 2010. 88 Pages.

* cited by examiner

AUTOMATIC CREATION AND ANNOTATION OF SOFTWARE-RELATED INSTRUCTIONAL VIDEOS

BACKGROUND

The present invention generally relates to programmable computing systems, and more specifically to programmable computing systems configured and arranged to automatically create and annotate software-related instructional videos.

Computer systems have been developed that enable the access and viewing of software-related instructional videos that provide audio and visual explanation of a function of software application. Software instructional videos can include both micro-videos and tutorial videos. Micro-videos are usually limited to one software function and last only a few minutes. Tutorial videos cover multiple software functions and can last well over an hour. A software application user can access and retrieve instructional videos from a remote computer system (or server) by entering a search query for the software application into a web browser. The web browser fetches videos from the remote computer system and displays on a local display of a local computing device a list of potential matches. The user selects an instructional video, and the video is played on the local computing device.

SUMMARY

Embodiments of the present invention are directed to an automatic creation and annotation of software-related instructional videos. A non-limiting example computer-implemented method includes receiving a first instructional video describing a first method of using a function of a first software application; determining each step of the first method described in the first instructional video; determining, by the processor, a second method of using a first function of a second software application, wherein the first function of the first software application is substantially the same as the first function of the second software application; and creating a second instructional video describing each step of the second method.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
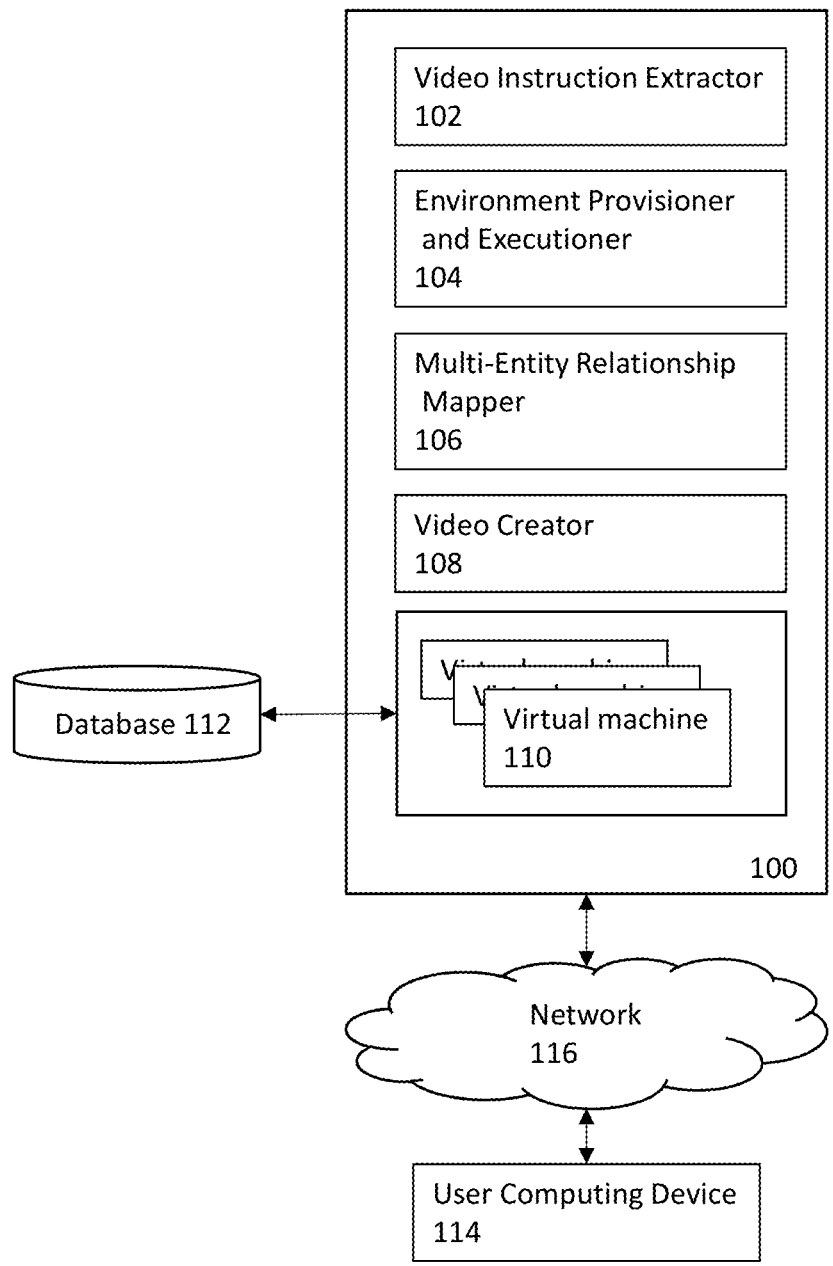
FIG. 1 illustrates a block diagram of components of an instructional video creation system in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer implemented methods and computing systems configured and arranged to analyze an instructional video to learn steps that are required in order to use a software application function. The learned steps are used to create a new instructional video that provides instructions on how to use the corresponding function on a different version of the software application.

Software applications are end-user programs that enable a user to interface with a computing system and perform a task. Software applications, such as word processor, video conferencing platforms, and information management system algorithms enable computers to perform necessary work functions. For example, software applications enable users to interface with and control entertainment devices, phones, appliances, and smart home systems.

The internet is filled with online instructional videos that help users resolve software application-related issues. However, one issue that can arise for users is when an available instructional video is prepared for a different software application version than the software application version that is of interest to the user. For example, the available instructional video describes version 2.3 of a software application, and the user needs video instruction on version 3.1 of the software application. In many instances, a user interface of the instructional video software version has a different layout than a user interface of the user's software application version. As a result, the user is unable to reconcile the differences between the user interface in the instructional video with the user interface on their version of the software application. As a result, and unable to resolve their issue through the instructional videos.

One or more embodiments of the present invention address one or more of the above-described shortcomings by providing computer implemented methods and computing systems configured and arranged to convert an instructional video that provides instruction about a first version of a software application to an instructional video that provides instruction about a different version of the software application. In embodiments of the invention, the computer system analyzes an instructional video to learn the various steps that are required in order to use a function of the first version of the software application. The computer system further analyzes the different version of the software application to learn the steps that are required in order to use the corresponding function of the different version of the software application. The computer system uses this learned information to either augment the original instructional video or create a new instructional video describing the steps that are required in order to use the function on the different version of the software application.

Turning now to FIG. 1, a video creation system 100 is generally shown in accordance with one or more embodiments of the present invention. The system 100 includes a video instruction extractor 102 for receiving and evaluating an instructional video, an environment provisioner 104 for initiating a virtual machine 110 to generate instructional content, a multi-entity relationship mapper 106 for receiving generated instructional content and simulating the generated instructional content, a video creator 108 for creating a new instructional video using on the generated content, and a set of virtual machines 110 for analyzing an instructional video. The system 100 is accessible to a user's computing device 114 via a network 116.

The video instruction extractor 102 is operable for receiving a raw instructional video. The video instruction extractor 102 preprocesses the raw instructional video and any associated metadata to extract features from the video. The features are related to character of the instructional video, for example, a presence of visual elements, audio elements, and/or computer-generated graphic elements. Based on the character of the instructional video, the video instruction extractor 102 determines one or more appropriate models to analyze the video. Therefore, if an instructional video only includes video content, the video instruction extractor 102 need only select a model for analyzing visual elements and not a model for analyzing audio elements.

The video instruction extractor 102 transmits the model determination(s) to the environment provisioner 104, which in turn, selects one or more virtual machines 110 to analyze the instructional video using the model(s). Each virtual machine is a software representation, or emulation, of a physical computer. Each virtual machine can further run an operating system and applications independently of the other virtual machines. The software within each virtual machine is contained and cannot interfere with the other virtual machines. Each of these new virtual machines can then run their own operating systems and applications independently while still sharing the original resources from the bare metal server, which the hypervisor manages. Those resources include memory, RAM, storage, etc.

The environment provisioner 104 is in operable communication with a server 50 capable of running multiple virtual machines 110. Each virtual machine 110 is a software-defined computer with its own operating system. Each virtual machine 110 can be implemented as a neural network such as a fully connected deep network (FC), a convolutional neural network (CNN), and a recurrent neural network (RNN). Each virtual machine 110 is configured to analyze the instructional video using one or more models.

Each virtual machine(s) 110 is configured to run at least one configuration of the software application and at least one model to determine the steps of the method described in the instructional video. The virtual machine(s) 110 uses the model(s) to analyze the instructional video to determine each step in the method described in the instructional video. A method step includes, for example, clicking on a tab on the user interface, entering text into a query, or uploading a document. Upon potentially determining a potential step, the virtual machine 110 verifies the potential step. The virtual machine 110 simulates the step on the same software application, as shown in the instructional video. The virtual machine 110 further compares the software application's response to the response shown in the instructional video. If the response of the virtual machine's simulation matches the response shown on the instructional video, the virtual machine 110 determines that the potential step is valid. If the response of the virtual machine's simulation does not match the response shown on the instructional video, the virtual machine 110 determines that the potential step is not valid. Whether a potential step matches a step in the instructional video, is based on whether the potential step and response fall within a statistical lower bound and upper bound of a confidence interval. Each virtual machine 110 continues to analyze the instructional video until at least one virtual machine 110 determines each step in the method described in the video.

As to visual elements in the instructional video, the virtual machine 110 uses models that rely on image recognition and computer vision techniques to analyze the image portion of the video. Using the model, the virtual machine 110, analyzes the visual elements of the instructional video. For example, analyzing a layout of the user interface to verify the software application version and/or operating system. Analyzing the motion of a cursor can be used to determine which user interface elements (e.g. tabs, drop-down menus, sliders, etc.) are being accessed to perform steps described in the instructional video. Analyzing words written on elements of the user interface can be used to determine the functionality of the user interface element. Detecting a cursor move towards a tab on a user interface can be used to determine which user interface element is being used during which step of an instructional video. Analyzing graphical text can be used to determine the steps or instructions provided by the instructional video. This information can be used in addition to any metadata associated with the instructional video. For example, the metadata can include a description of the software application, including version, or a description of the concept covered by the instructional video.

The virtual machine 110 is also operable to use a model that employs natural language processing (NLP) techniques to analyze any audio portion of the instructional video. NLP allows the virtual machine 110 to receive audio signals from the instructional video and extract features that enable a model to convert the audio signals into a sequence of words understandable by a computer. Similarly, to the image recognition and computer vision techniques, NLP techniques are used to analyze the instructional video to determine, for example, the operating system, the version of the software application, the steps of the instruction method, and a description of the problem being solved.

In addition to using models or generating inputs for a model, a virtual machine 110 can access a database 112 that stores a description of user interface elements and their corresponding function. The database further stores a list of steps used to practice a functionality of a software application. In some embodiments of the present invention, the steps are stored in a graph-structure, in which each node describes a step. Each step includes a user interface element, an action toward the element, and response to the action. Each path connecting two nodes is an indication of moving to a next step in the method. Therefore, the virtual machine 110 could learn the steps of method by following a path of nodes in the tree-structure. The database 112 is updated each time a virtual machine 110 determines a step or determines a functionality of a user interface element. It is conceivable that the system 100 has previously analyzed the instructional video or analyzed another instructional video teaching the same method. Therefore, system 100 can learn a method by reviewing the graph structure and following a path that describes each step of the method in the instructional video.

Once a virtual machine 110 determines each step described in the instructional video, the multi-entity relationship mapper 106 determines whether the user's software application has the same functionality as the software application in the instructional video. To do so, the multi-entity mapper 106 performs a search in the graph structures of the both pieces of software, from the original instructional video and from the virtual machine 110, and software stored the database 112 for finding a matching functionality. Once a match is found, the multi-entity mapper 106 follows the path that leads to the found functionality in the graph data structure related to the piece of software under analysis. Once a node that corresponds to the root of the user interface is found, the multi-entity relationship mapper 106 is able to determine the set of actions in the user interface that performs the requested functionality. For example, suppose version A of an image editing software has functionality to fill a selected region with a color by navigating through a menu structure such as "Image→Selection→Fill Selection", clicking "Fill Selection" and choosing a color from a color picker to fill the region. Suppose further that, in version B of the same image editing software, this functionality is reached by first selecting a color, and then navigating through a different menu structure, such as "Edit→Selection→Fill". In this case, the database 112 would have an entry mapping the two different methods and the type of operation to be performed. In some embodiments, there is a one-to-one mapping between functionality of different versions of a software application. However, the number of steps to execute the functionality differ, as in the example above. Therefore, irrespective of the number of steps taken in the version B of the image editing software, the final result of applying the steps in version B of the image editing software is identical to the final result of the steps taken in version A of the image editing software. The virtual machine 110 ensures that the result of version B of the image editing software matches the result of version A of the image editing software.

If the user's software application has the same functionality as the software application in the instruction video, the virtual machine 110 generates code describing a method to practice the functionality on the user's software application. In one embodiment, the database 112 can be pre-populated by performing Natural Language Processing (NLP) in the software documentation to learn to map software user interface elements to software functionality. In another embodiment, the system may traverse the user interface resource tree of the software, which stores the hierarchy of user interface elements, to discover functionality. In yet another embodiment, the set of functionalities may be queried using accessibility APIs for the software.

The video creator 108 is operable to receive the code from the multi-entity relationship mapper 106 to either augment an instructional video or create a new instructional video. The video creator 108 is further operable to either augment the original instructional video with additional graphics and audio, or the video creator 108 can generate a new instructional video. The user selects whether the video creator 108 augments an existing instructional video or generates a new instructional video. If the video creator 108 is directed to augment the original instructional video, it is operable to describe the method by adding or removing prompts. The prompts can be visual and/or audio prompts. For example, the steps in the original instructional video may have directed the user to click on tab A, however the user's software application requires that the user click on tab B. The video creator 108 can add a graphical cursor to point tab B and remove the cursor pointing to tab A. Furthermore, the original audio can be removed and new audio can be added in to instruct the user to click tab B. In addition or as a replacement to either the cursor or the audio a pop-up comment box can be added with instructions to click on tab B. In this situation, a virtual machine 110 is used to verify that adding or deleting content from the original instructional video leads to a final result of applying the steps in augmented instructional video as the final result of the steps taken in the original instructional video. helps teach a set of steps that It should be appreciated that the video creator 108 can create a variety of audio and visual prompts to describe a step of a method to access a functionality of the user's software.

As described above, the video creator 108 can also create a new instructional video. The new instructional video describes the steps of the method on the user's software application. To create the new instructional video, the video creator 108 receives images of the user interface of the user's software application as the steps of the method are demonstrated. The images are generated by the virtual machine 110 and transmitted to the video creator 108. For example, as the virtual machine 110 determines the method steps for a user's version of a software application, images or video of the graphical user interface of the user's version of the software application can be extracted. The extracted images or video can be used to generate a new instructional video. Furthermore, the code generated by the virtual machine 110 is used to augment the newly created instructional video. For example, the user interface images can be augmented with audio and visual prompts to guide the user through the steps of the method.

Each virtual machine 110 is trained to analyze instructional videos to determine a method taught by the video. Each virtual machine 110 is trained using ground truth data (i.e., prior instructional videos). During training, the parameters of the virtual machine 110 are adjusted based on the ground truth data to minimize the errors between the methods described in the instructional videos and the methods determined by the virtual machine 110.

Figure 2:
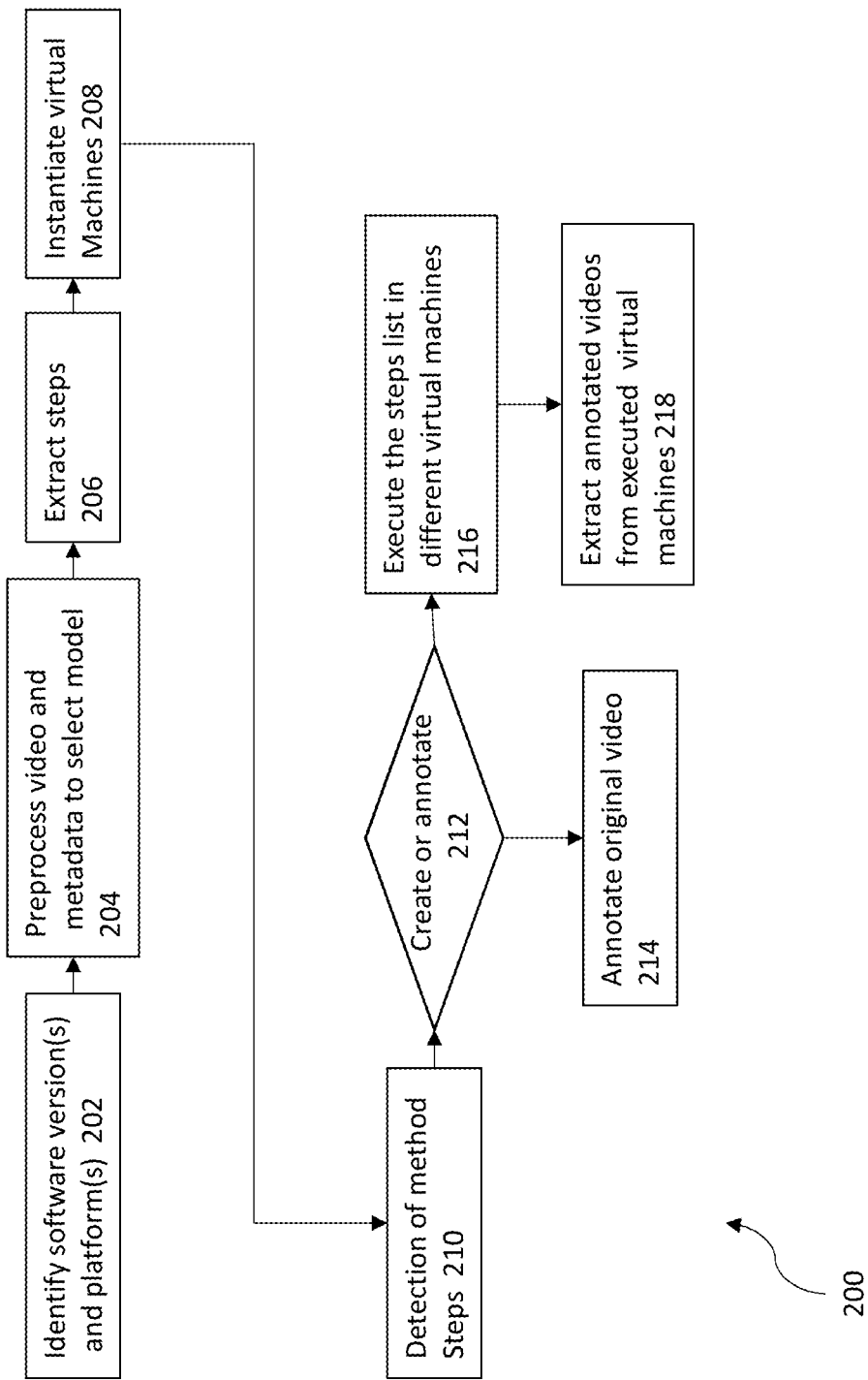
FIG. 2 illustrates a flow diagram of a process for instructional video creation in accordance with one or more embodiments of the present invention.

Referring to FIG. 2, a flow diagram for computer-implemented method 200 for instructional video creation is shown. At block 202, the software application described in the instructional video is described. This can be performed through various methods or combinations of methods. Image processing techniques can be used to analyze the user interface displayed on the instructional video and compare the images with images of user interfaces of software applications. In other instances, NLP techniques are employed to read a comments section on a website displaying the video or to read the title of the video. In yet even other instances, a user identifies the software application in the instructional video. At block 204, the instructional video is preprocessed to assist with feature extraction. Preprocessing includes transforming the raw video data prior to inserting it into a machine learning or deep learning algorithm. At block 206, the features from the instructional video are extracted to determine an appropriate model to use to analyze the instructional video. The features are indicative of the presence of audio and/or visual elements in the instructional video and a format of the instructional video. At block 208, a group of virtual machines is instantiated based on the extracted feature. Each virtual machine in the group of virtual machines is operable to employ at least one respective models to analyze the instructional video. The features are used to determine which model is the most appropriate to analyze the video. The virtual machine analyzes the video to determine the steps of the method of accessing a functionality of software application at block 210.

At block 212 a determination is made to either create a new instructional video or annotate the original instructional video. If a user chooses to receive an annotated video, the original instructional video is augmented with visual and audio prompts. The new audio and visual prompts describe the method steps for the user's software application and replace the audio and visual prompts from the original instructional video. If, however, the user chooses to receive a new instructional video, the determined steps for the user's software application are retrieved at block 216. At block 218, images of the user interface of user's software application are retrieved to describe the steps of the method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs)

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
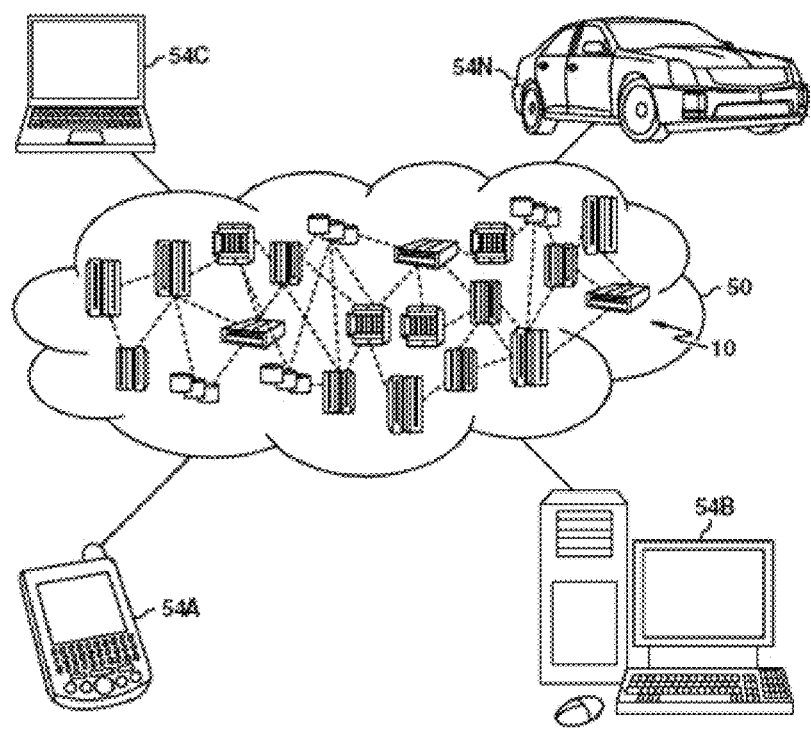
FIG. 3 depicts a cloud computing environment according to one or more embodiments of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
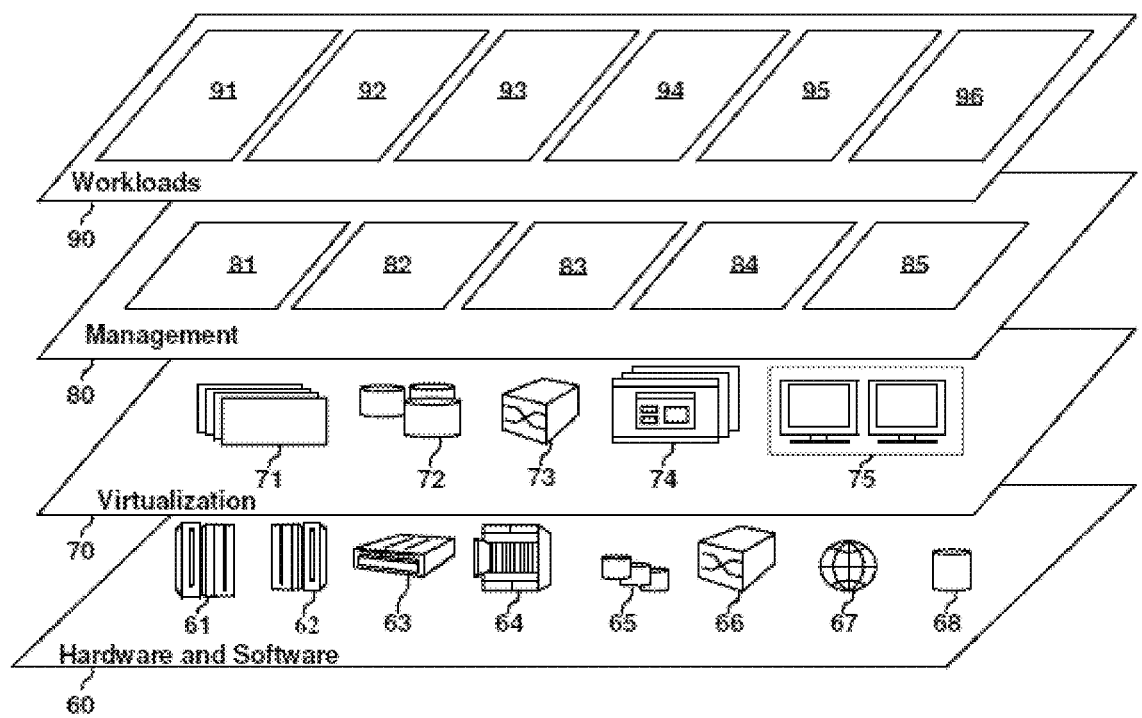
FIG. 4 depicts abstraction model layers according to one or more embodiments of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and creating instructional video content 96.

Figure 5:
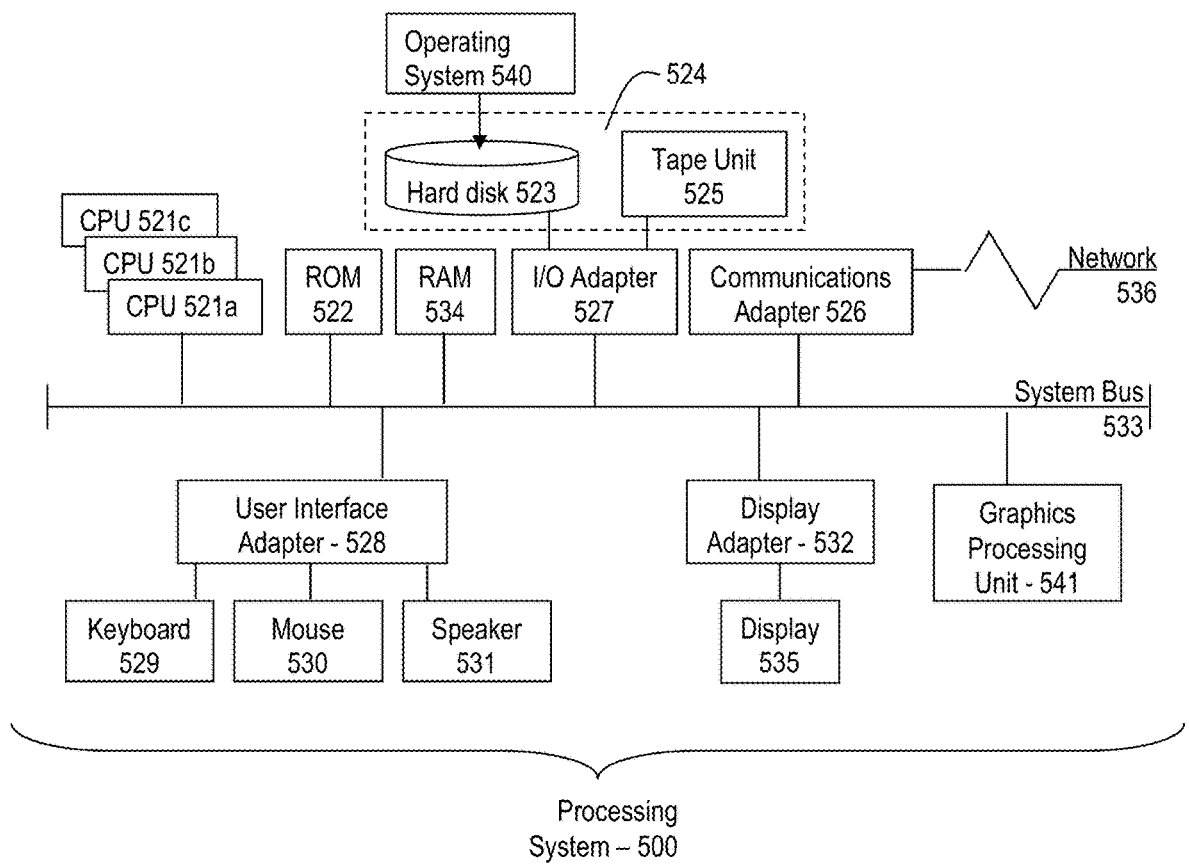
FIG. 5 depicts a block diagram of a computer system for use in implementing one or more embodiments of the present invention.

It is understood that the present disclosure is capable of being implemented in conjunction with any other type of computing environment now known or later developed. For example, FIG. 5 depicts a block diagram of a processing system 500 for implementing the techniques described herein. In examples, the processing system 500 has one or more central processing units (processors) 521a, 521b, 521c, etc. (collectively or generically referred to as processor(s) 521 and/or as processing device(s)). In aspects of the present disclosure, each processor 521 can include a reduced instruction set computer (RISC) microprocessor. Processors 521 are coupled to system memory (e.g., random access memory (RAM) 524) and various other components via a system bus 533. Read only memory (ROM) 522 is coupled to system bus 533 and may include a basic input/output system (BIOS), which controls certain basic functions of the processing system 500.

Further depicted are an input/output (I/O) adapter 527 and a network adapter 526 coupled to the system bus 533. I/O adapter 527 may be a small computer system interface (SCSI) adapter that communicates with a hard disk 523 and/or a storage device 525 or any other similar component. I/O adapter 527, hard disk 523, and storage device 525 are collectively referred to herein as mass storage 534. Operating system 540 for execution on processing system 500 may be stored in mass storage 534. The network adapter 526 interconnects system bus 533 with an outside network 536 enabling processing system 500 to communicate with other such systems.

A display (e.g., a display monitor) 535 is connected to the system bus 533 by display adapter 532, which may include a graphics adapter to improve the performance of graphics intensive applications and a video controller. In one aspect of the present disclosure, adapters 526, 527, and/or 532 may be connected to one or more I/O busses that are connected to the system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. An input device 529 (e.g., a keyboard, a microphone, a touchscreen, etc.), an input pointer 530 (e.g., a mouse, trackpad, touchscreen, etc.), and/or a speaker 531 may be interconnected to system bus 533 via user interface adapter 528, which may include, for example, a Super I/O chip integrating multiple device adapters into a single integrated circuit.

In some aspects of the present disclosure, the processing system 500 includes a graphics processing unit 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing and has a highly parallel structure that makes it more effective than general-purpose CPUs for algorithms where processing of large blocks of data is done in parallel.

Thus, as configured herein, the processing system 500 includes processing capability in the form of processors 521, storage capability including system memory (e.g., RAM 524), and mass storage 534, input means such as keyboard 529 and mouse 530, and output capability including speaker 531 and display 535. In some aspects of the present disclosure, a portion of system memory (e.g., RAM 524) and mass storage 534 collectively store the operating system 540 to coordinate the functions of the various components shown in the processing system 500.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Computer Program Product Boilerplate Follows

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

End of Computer Program Product Boilerplate

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, a first instructional video describing a first method of using a function of a first software application;
analyzing, by the processor, the first instructional video to learn one or more original steps of the first method described in the first instructional video, wherein executing one or more original steps performs the function of the first version of the software application;
analyzing, by the processor, a second software application to determined a second method of using a function of the second software application and to learn one or more steps of the second method described, wherein executing one or more steps of the second method performs the function of the second software application, and wherein the function of the second software application is substantially the same as the function of the first software application;
comparing steps of the second method of the second software application to the one or more original steps of the first method described in the first instructional video;
determining a different software version between the second software application and the first software application in response to determining that one or more of the steps of the second method are different from one or more of the original steps of the first method;

editing the one or more original steps of the first method that are different from the one or more steps of the second method such that each of the one or more original steps and the edited steps substantially match the steps of the second method of the second software application; and creating, by the processor, a second instructional video including the one or more original steps and the edited steps to describe the second method.

2. The computer-implemented method of claim 1 further comprising:

preprocessing the first instructional video to detect a presence of any visual elements and audio elements; and selecting a computational model to analyze the instructional video based on the presence of any audio or visual elements, wherein the determination of the second method is based at least in part on the analysis.

3. The computer-implemented method of claim 1, wherein determining each step of the first method described in the instructional video comprises applying, via virtual machine, image recognition techniques to analyze a user interface of the first software application displayed on the first instructional video.

4. The computer-implemented method of claim 1, wherein the second software application is a different version of the first software application.

5. The computer-implemented method of claim 1, storing each step of the first method as a node in a graph data structure.

6. The computer-implemented method of claim 1, wherein creating the second instructional video comprises augmenting the first instructional video with visual prompts.

7. The computer-implemented method of claim 1, wherein creating the second instructional video comprises creating visual content from images of the second method being applied to the second software application.

8. A system comprising:

a memory having computer readable instructions; and one or more processors for executing the computer readable instructions, the computer readable instructions controlling the one or more processors to perform operations comprising:

receiving a first instructional video describing a first method of using a function of a first software application;

analyzing, by the processor, the first instructional video to learn one or more original steps of the first method described in the first instructional video, wherein executing one or more original steps performs the function of the first version of the software application;

analyzing, by the processor, a second software application to determine a second method of using a function of the second software application and to learn one or more steps of the second method described, wherein executing one or more steps of the second method performs the function of the second software application, and wherein the function of the second software application is substantially the same as the function of the first software application; and comparing steps of the second method of the second software application to the one or more original steps of the first method described in the first instructional video;

determining a different software version between the second software application and the first software application in response to determining that one or more of the steps of the second method are different from one or more of the original steps of the first method;

editing the one or more original steps of the first method that are different from the one or more steps of the second method such that each of the one or more original steps and the edited steps substantially match the steps of the second method of the second software application; and creating a second instructional video including the one or more original steps and the edited steps to describe the second method.

9. The system of claim 8, wherein the operations further comprise:

preprocessing the first instructional video to detect a presence of any visual elements and audio elements; and selecting a computational model to analyze the instructional video based on the presence of any audio or visual elements, wherein the determination of the second method is based at least in part on the analysis.

10. The system of claim 8, wherein determining each step of the first method described in the instructional video comprises analyzing, via a virtual machine, a user interface of the first software application displayed on the first instructional video.

11. The system of claim 8, wherein the second software application is a different version of the first software application.

12. The system of claim 8, storing each step of the first method as a node in a graph data structure.

13. The system of claim 8, wherein creating the second instructional video comprises augmenting the first instructional video with visual prompts.

14. The system of claim 8, wherein creating the second instructional video comprises creating visual content from images of the second method being applied to the second software application.

15. A computer program product comprising a computer readable storage medium having program instructions embodied therewith, the program instructions executable by a processor to cause the processor to perform operations comprising:

receiving a first instructional video describing a first method of using a function of a first software application;

analyzing, by the processor, the first instructional video to learn one or more original steps of the first method described in the first instructional video, wherein executing one or more original steps performs the function of the first version of the software application;

analyzing, by the processor, a second software application to determine a second method of using a function of the second software application, wherein executing one or more steps of the second method performs the function of the second software application, and wherein the function of the second software application is substantially the same as the function of the first software application;

comparing steps of the second method of the second software application to the one or more original steps of the first method described in the first instructional video;

determining a different software version between the second software application and the first software application in response to determining that one or more of the steps of the second method are different from one or more of the original steps of the first method;

editing the one or more original steps of the first method that are different from the one or more steps of the second method such that each of the one or more original steps and the edited steps substantially match the steps of the second method of the second software application; and creating a second instructional video including the one or more original steps and the edited steps to describe the second method.

16. The computer program product of claim 15, wherein the operations further comprise:

preprocessing the first instructional video to detect a presence of any visual elements and audio elements; and selecting a computational model to analyze the instructional video based on the presence of any audio or visual elements, wherein the determination of the second method is based at least in part on the analysis.

17. The computer program of claim 15, wherein determining each step of the first method described in the instructional video comprises analyzing, via virtual machine, a user interface of the first software application displayed on the first instructional video.

18. The computer program product of claim 15, wherein the second software application is a different version of the first software application.

19. The computer program product of claim 15, wherein the operations further comprise storing each step of the first method as a node in a graph data structure.

20. The computer program product of claim 15, wherein creating the second instructional video comprises augmenting the first instructional video with visual prompts.

* * * * *